March 27, 1928.
E. R. BOOTS ET AL
REFLECTOR BELT
Filed March 8, 1924
1,663,791
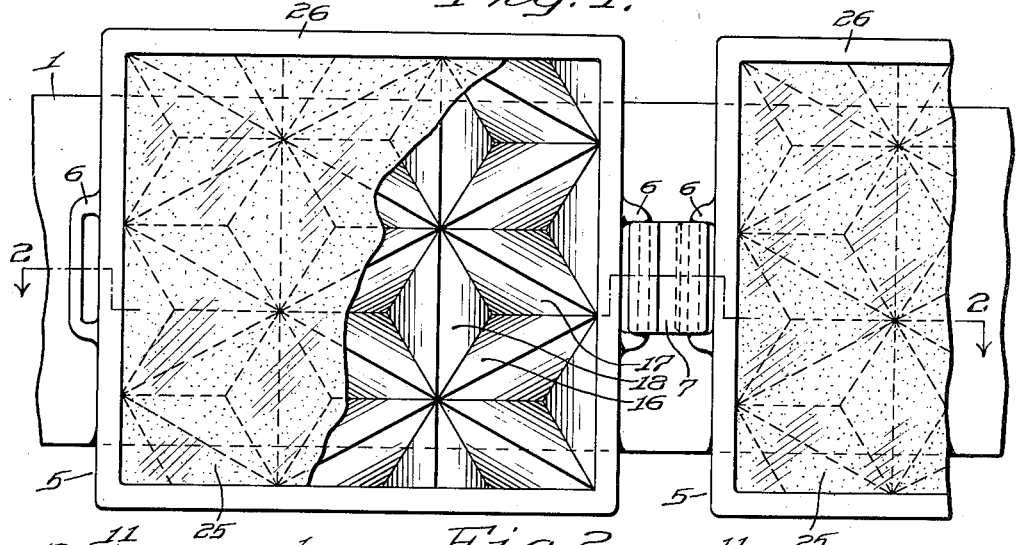
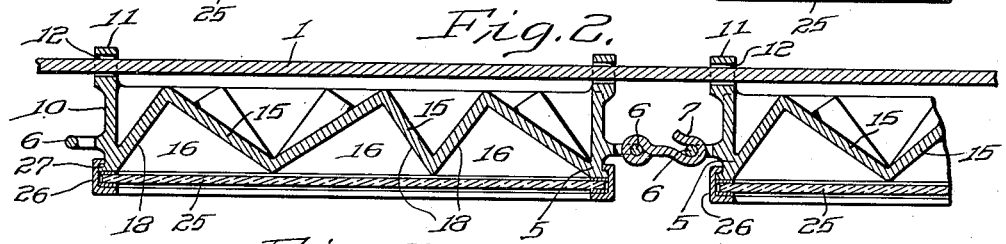
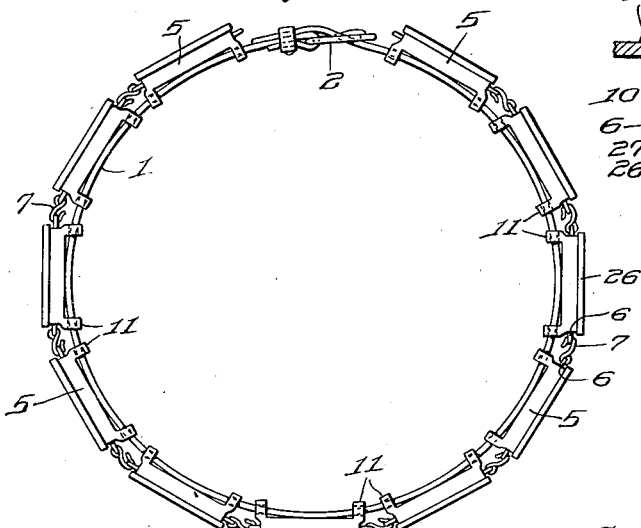
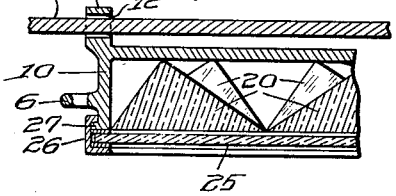
INVENTORS
Edmund R. Boots,
Sven August Eskilson.
WITNESS Patented Mar. 27, 1928.

1,663,791

UNITED STATES PATENT OFFICE.

EDMUND R. BOOTS, OF EAST ORANGE, NEW JERSEY, AND SVEN AUGUST ESKILSON, OF STOCKHOLM, SWEDEN, ASSIGNORS TO AMERICAN GASACCUMULATOR COMPANY, OF ELIZABETH, NEW JERSEY, A CORPORATION OF NEW JERSEY.

REFLECTOR BELT.

Application filed March 8, 1924. Serial No. 697,731.

Our invention relates broadly to belts but more particularly to belts which are provided upon their outer sides with reflectors arranged in series or at intervals. In the case of policemen, highway guards and others who are upon the highways and streets where there is considerable automobile traffic it is desirable that they should be provided with means whereby their presence may be made known in the night-time or in the darkness to such automobilists.

The general object of our invention, therefore, is to provide a novel construction of belt by means of which, when worn or carried by a person in the night-time, the presence of such person in front of an automobile or other vehicle carrying headlights is made known to the operator of such automobile or vehicle by the return or reflected rays of the lamp from the reflectors of the said belt.

A further general object of the invention is to provide a novel construction of means whereby the safety of persons upon the highways and streets in the night-time is greatly enhanced because by reason of such means their presence is made known to the operators of automobiles or other vehicles carrying head-lights which may be approaching such persons.

To these and other ends our invention comprehends the construction and arrangement of parts as hereinafter set forth in detail in the specification, particularly pointed out in the claims and as illustrated in the drawing in which we have illustrated one convenient form of mechanical embodiment of our invention. It is to be understood, however, that changes in the details of construction may be made within the scope of the claims without departing from our invention.

In the drawing:

Fig. 1 is a view in elevation of the outside of a section or portion of belt embodying our invention;

Fig. 2 is a longitudinal section taken on the line 2—2 of Fig. 1;

Fig. 3 is a view in edge elevation of the said belt; and

Fig. 4 is a horizontal sectional view of a portion of link showing a modification of the structure.

Referring to the drawing: 1 designates a band of suitable flexible material one end of which is provided with a buckle 2 by means of which the opposite ends thereof are adapted to be detachably connected together.

5 designates as a whole a series of link members or light reflector carriers provided with loop eyes 6 at their opposite ends. A hook 7 is secured to one of the loop eyes of each link and the opposite free end thereof is adapted to engage the loop eye of the next adjacent link. The said links comprise side and end walls 10 the inner edges of which are provided with projections or extensions 11 through which openings 12 are provided. The flexible strap or belt 1, previously referred to, extends through these openings whereby the links 5 are held or supported thereon in juxtaposition with respect to each other. When the flexible belt or strap 1 is buckled around the body of a person or around any other portion of the body of a person the said links are held in relatively fixed position upon the said belt or strap and upon such person.

Referring now to Figs. 1, 2 and 3 of the drawing it will be noted that the central or body metallic portions of the links 5 are provided with depressed portions 15 which are of triangular pyramidal shape. The inner surfaces 16, 17 and 18 of these portions form figures of like shape and are at right angles with respect to each other so that rays of light which may impinge upon any one of the said surfaces are ultimately reflected back along lines parallel to the incident rays.

It will be apparent that if a person upon a highway or street in the night-time were provided with a belt having a plurality of groups of reflectors arranged in the manner as described the presence of such person would be known to the operator of an approaching automobile or other vehicle having head-lights by reason of the reflection of the rays from the head-lights back to such operator.

The surfaces 16, 17 and 18 in the construction as shown are polished so as to convert them into light reflecting surfaces or mirrors. However, it will be understood that the said surfaces may, if preferred, be lined with the ordinary, well known glass mirrors.

In Fig. 4 of the drawing we have provided a modification of the structure in which solid glass prisms 20 of triangular pyramidal shape have been substituted for the correspondingly shaped depressions 15 and reflecting surfaces 16, 17 and 18. In the construction as shown in Fig. 4 the rear surfaces of the prisms constitute the reflecting surfaces thereof. The rays of light which strike the fronts or outer faces of the prisms 20 pass therethrough and are reflected by the rear surfaces thereof so that ultimately they are reflected or returned in parallel relation to the incident rays, with the result that the presence of a person who may be wearing a belt provided with such prisms is made known to the operator of an approaching automobile or other vehicle having head-lights thereon.

The prisms 20 may be mounted within the frame structure of the links 5 in any desired and suitable manner.

Although it is not essential that plates shall be employed upon the links in front of the mirrors or in front of the prisms 20, yet in both forms of construction we have shown such plates. These plates are indicated at 25 and overlie the front or outer faces of the links 5. The said plates 25 may be smooth and transparent or light diffusing and may be clear or colored as desired. The said plates are seated against the outer edges of the frame-like portions of the said links and are retained in place by the rims 26 which are of channel shape in cross section. One of the flanges of the said rims engages the inner sides of flanges 27 upon the said links while the outer flange thereof engages the outer sides of the outer edge portions of the said plates, as is clearly shown in Figs. 2 and 4 of the drawing. Instead of plates, as shown, any other suitable light diffusing means may be employed.

It will be seen that by our invention we are enabled to provide means which if worn by a person upon highways or streets in the night-time will enable his presence to be made known to the operator of an approaching vehicle having head-lights thereon. It is obvious that the safety of a person upon highways or streets at night-time which are frequented by automobiles and other vehicles carrying head-lights is greatly increased by the carrying of means by which his presence may be made known automatically to the operators of vehicles who may be approaching such person.

Having thus described our invention, what we claim and desire to secure by Letters Patent is:

1. A belt comprising in combination a plurality of groups of reflectors, frame members for supporting the respective groups, means for flexibly connecting the said groups together, and light diffusing plates located over the said respective groups.

2. A belt comprising a plurality of frame members secured together in spaced relation to each other, adjoining frame members being flexibly connected, and each of which frame members is provided with a plurality of groups of reflecting surfaces arranged in convergent and right angular relation to each other, substantially as described.

In testimony whereof the said EDMUND R. BOOTS has hereunto signed his name this 4th day of March, 1924, and the said SVEN AUGUST ESKILSON has hereunto signed his name this fifth day of February, 1924.

EDMUND R. BOOTS.
SVEN AUGUST ESKILSON.